UNITED STATES PATENT OFFICE.

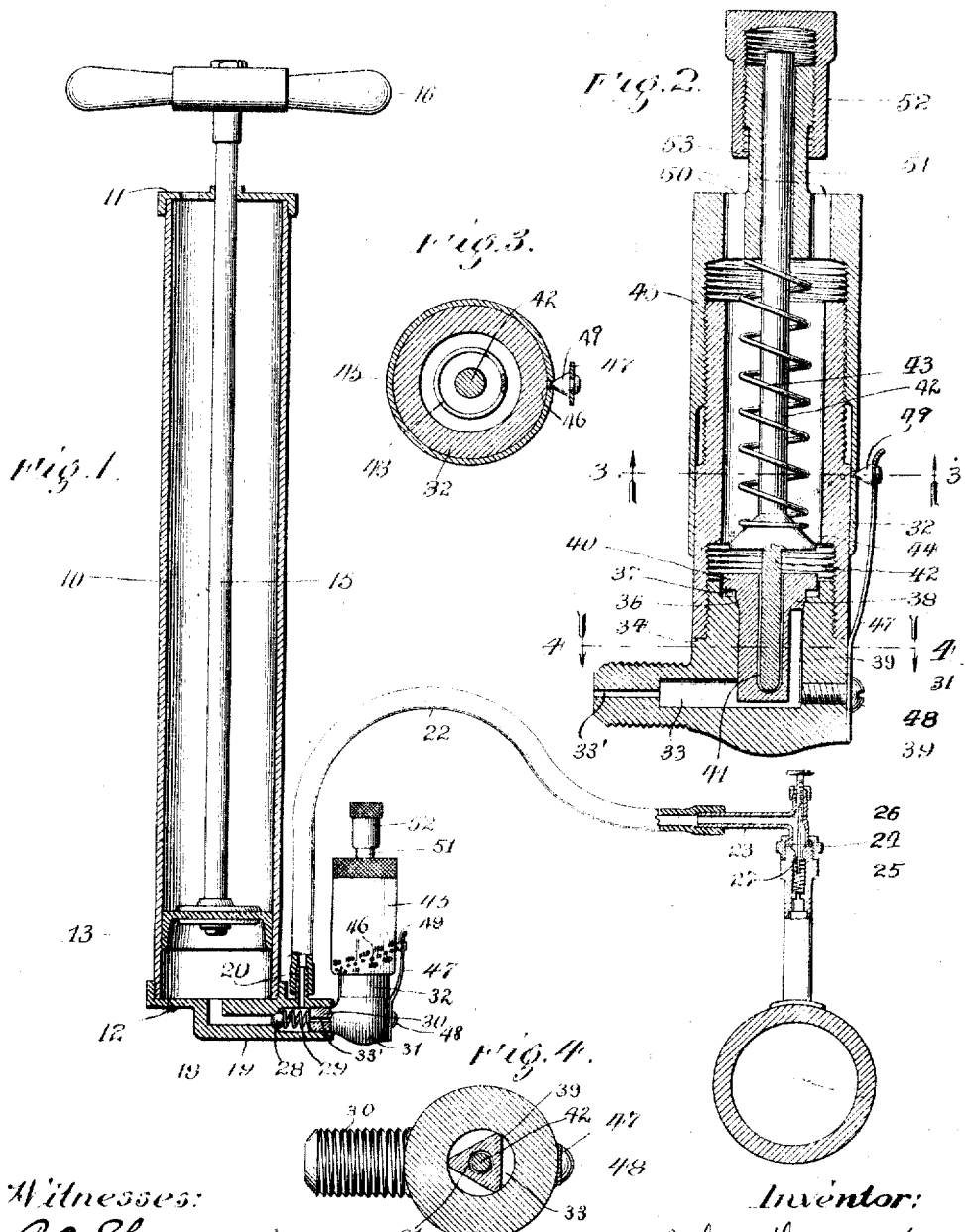

JOHN DESMOND, OF CHICAGO, ILLINOIS, ASSIGNOR TO ARTIZAN BRASS COMPANY, OF CHICAGO, ILLINOIS, A CORPORATION.

PRESSURE-CONTROLLING VALVE FOR TIRE-PUMPS.

No. 909,373.   Specification of Letters Patent.   Patented Jan. 12, 1909.

Application filed May 17, 1906. Serial No. 317,328.

To all whom it may concern:

Be it known that I, JOHN DESMOND, a citizen of the United States, and a resident of Chicago, county of Cook, and State of Illinois, have invented certain new and useful Improvements in Pressure-Controlling Valves for Tire-Pumps, of which the following is declared to be a full, clear, and exact description.

The invention relates to controlling valves for tire pumps by which the tire may be filled with air under pressure of a certain desired amount.

The invention seeks to provide a simple form of valve which may be used with any suitable pump and which may be readily set to relieve any excess pressure when the pressure in the tire has been raised to the desired extent by the operation of the pump.

A further object of the invention is to provide a pressure relief or controlling valve which will act as an audible signal to notify the operator when the desired pressure in the tire has been reached.

With these and other objects in view the invention consists in the features of construction, combinations and arrangements of parts hereinafter set forth, illustrated in the accompanying drawing and more particularly pointed out in the appended claims.

In the drawings, Figure 1 is a sectional view of the pump shown attached to a tire with the improved controlling valve applied thereto. Fig. 2 is an enlarged view in section of the improved valve. Figs. 3 and 4 are detail sections on lines 3—3 and 4—4 respectively of Fig. 2.

The improved valve may be employed with any usual or suitable form of pump; that shown in the drawings comprises a tubular body portion or cylinder 10 threaded at its ends into heads 11 and 12. A cupped piston 13 of leather or other suitable yielding material, is carried upon the lower end of a piston rod 15 that extends through the upper head 11 and is provided with an operating handle 16. Air is drawn into the pump through an opening 17 in the upper head 11 and is forced out through the discharge passage 18 extending through a boss or offset portion 19 of the lower head 12, and through an upright nipple 20 on the offset portion 19. The lower head 12 is usually provided with a suitable foot-piece (not shown).

One end of the flexible tube 22 is fixed to the nipple so as to be in communication with the discharge passage 18. The outer end of the tube is provided with an elbow nipple 23 having a coupling sleeve 24 by which it may be attached to the tire nipple 25. The elbow nipple 23 is preferably provided with an adjustable pin 26 which is arranged to engage and hold open the spring-held nipple valve 27.

Part of the discharge passage 18 within the outer end of the boss or offset portion 19 on the head 12, is enlarged to form a chamber for a check valve 28. A ball check valve is preferably employed and is held to its seat by a coiled cushion spring 29. The check valve 28 and its spring could be held in place by a plug threaded into the outer end of the passage or bore through the offset portion 19, but the improved pressure controlling valve may be conveniently mounted at this point and, for this purpose, the casing of the valve is provided with a nipple 30 that is threaded into the outer end of the offset portion 19 and serves to hold the spring 29 and check valve 28 in position.

In the form shown, the casing of the pressure controlling or relief valve comprises a lower elbow section 31 and an upper cylindrical section 32. The nipple 30 is on the lower casing section and is preferably supported on the pump as previously described. This lower section is provided with an angular relief port 33 extending therethrough and communicating with the discharge passage 18 of the pump at a point beyond the check valve 28. The upper section of the valve casing fits over and is threaded upon the upper end of the lower casing section 31 and abuts against a lip or shoulder 34 thereon. The lower casing section at the end of the relief port or passage is provided with a conical valve seat 36 and just above the seat with an annular recess 37 that is larger in diameter than the valve seat. The conical disk valve 38 fits the seat 36 and is provided with a depending guide portion 39 of the usual triangular outline, as indicated in Fig. 4, that fits within the upright portion of the relief port or passage 33. The valve is also provided on its upper end with an enlarged shoulder or flange 40 arranged within the annular recess 37 in the lower section of the valve casing. Flange or shoulder 40 is slightly smaller in diameter than the recess and is so mounted on the valve that, when the latter is seated, the lower face of the flange or shoulder 40 is spaced somewhat apart from the bottom of the recess 37.

The valve and valve guide are provided with a central socket or bore 41 extending downwardly from the upper end of the valve and closed at its lower end, as shown in Fig. 2. A stem 42 sets within the bore 41 and the lower end of the stem engages the lower end of the bore. The lower ends of both the stem and bore are preferably rounded and the stem is somewhat smaller than the bore so that the valve may be accurately seated in its closed position. A coiled cushion spring 43 extends about the upper end of the stem 42 and engages a conical flange or abutment 44 on the stem to yieldingly hold the valve to its seat.

The upper portion of the upper casing section 32 is slightly reduced and threaded, as shown in Fig. 2, and a sleeve 45 sets over the casing. The upper portion of the bore of this sleeve is slightly reduced and threaded to engage the threaded portion of the casing section 32. The lower portion of the bore of the thimble fits the smooth cylindrical portion of the casing below the threaded portion thereof. This sleeve engages the upper end of the cushion spring 43 so that the pressure exerted thereby may be easily regulated by screwing the sleeve up and down on the valve casing. By adjusting the sleeve the valve may be set so that it will lift from its seat and relieve the pressure on the tire when such pressure is raised to the desired amount.

The upper portion of the outer face of the sleeve is preferably knurled, as shown, so that it may be readily adjusted. For convenience in determining the amount of the adjustment of the sleeve and to lock it in position in such adjusted position, its lower portion is provided with a number of holes 46 arranged in a spiral around the same and a leaf spring 47 secured at its lower end by a screw 48 to a flattened face on the lower casing section 31 is provided at its upper end with a pointed teat 49 arranged to engage the openings 46 as the thimble is screwed up and down on the valve casing. The holes 46 are marked with a suitable scale to aid in determining the proper adjustment of the sleeve.

The upper end of the sleeve is provided with discharge openings 50 and with a central upwardly projecting guide 51 through which the upper end of the stem 42 extends. The upper portion of the guide 51 is slightly enlarged and is exteriorly threaded and an interiorly threaded cap 52 sets over the guide and engages the threaded portion thereof. This cap engages the upper projecting end of the stem 42 and may be screwed down to hold the valve on its seat and prevent it from lifting therefrom. The lower edge of the cap is turned or swaged inwardly to form a lip 53 below the enlarged threaded portion of the guide 51 so that the cap cannot become detached from the sleeve. It is free however to be screwed up and down on the guide into and out of engagement with the end of the stem but is positively held thereon so that it cannot be lost.

Automobile tires as usually constructed, are adapted to be used with a certain definite pressure varying from 80 to 120 lbs. with different tires. For proper operation and to prevent the tire from cutting on the rim of the wheel, the air in the tire should be maintained at a certain definite pressure for which the tire is adapted, but this pressure should not be exceeded for otherwise, the tire construction would be submitted to an undue and improper strain. It is therefore quite important that the tire should be filled with air at a certain definite pressure, which pressure however should not be exceeded. In filling the tires with the pump provided with the improved controlling or relief valve, the sleeve 45 thereof is adjusted on the valve casing in accordance with the desired pressure. This may be easily and quickly perfected and when the sleeve is adjusted it is locked in adjusted position by the engagement of the teat 49 with one of the holes 46. When, by the operation of the pump, the desired pressure is reached, the valve 38 will be lifted from its seat against the tension of the spring 43 and any excess of air will escape through the relief valve.

As soon as the valve 38 is lifted slightly from its seat, air escapes into the space in the recess 37 below the flange or shoulder 40 of the valve so that the area on the under side of the valve which is exposed to the air pressure is suddenly increased and the valve is quickly lifted. As soon as the flange 40 is raised out of the recess 37, the pressure on the valve is slightly relieved and it tends to close. This operation is then repeated and by such action, the valve is very rapidly vibrated so that the air escapes through it with a burring or whistling sound. The relief valve thus forms an audible signal to notify the operator when the desired limit of pressure has been reached.

To insure that the valve will not lift from its seat until the air in the tire has reached the desired limit, the relief port 33 of the valve is preferably provided with a reduced or choked inlet 33', which is smaller than the passage through the nipples 23 and 25 or any other portion of the passage between the pump and tire.

If the passages through the flexible tire 22 or through the nipple of the tire is somewhat choked, the valve would be lifted from its seat before the desired limit of pressure is reached in the tire. When such a condition is suspected, the cap 52 is screwed down on the sleeve 51 into engagement with the stem 42 so as to hold the valve 38 against movement on its seat. The operator, after pumping up the tire, will loosen the cap 52 and, if the pressure in the tire exceeds the desired limit, the excess will escape through the relief valve.

The fact that the coupling at the end of pipe 22 is provided with means for holding the valve of the tire nipple open, insures that the relief valve will always be subjected to the pressure in the tire. It also permits the operator, if the connections are choked up, to screw down the cap 52 to prevent the operation of the relief valve, as described, and then, by loosening the cap, to permit the escape of the excess air in the tire through the relief valve. The improved device may thus be used to insure the pumping up of the tires to the desired definite pressure under varying conditions.

It is obvious that numerous changes may be made in the details of structure without departure from the essentials of the invention.

Having described my invention, what I claim as new and desire to secure by Letters Patent is:—

1. The combination with an air pump for tires having a discharge passage, a check valve in said discharge passage and a pipe communicating therewith having a coupling on its end for engaging the tire nipple, said coupling having means for holding the nipple valve open, of a relief valve casing open to the air and having a relief port communicating with the discharge passage from said pump intermediate said check valve and said coupling and provided with a valve seat, a relief valve on said seat, a cushion spring for yieldingly holding said relief valve on its seat, means for adjusting the pressure of said spring, and means independent of said spring for throwing said relief valve into and out of operation, substantially as described.

2. The combination with an air pump for tires having a discharge passage, a check valve in said passage and a pipe communicating therewith having a coupling on its end for engaging the tire nipple, said coupling having means for holding the nipple valve open, of a relief valve casing, open to the air and having a relief port communicating with the discharge passage from said pump intermediate said check valve and said coupling, said casing having a valve seat, a relief valve on said seat, a cushion spring for yieldingly holding said valve on its seat, means for adjusting the pressure of said spring, and adjustable means independent of said spring for positively holding said valve on its seat, substantially as described.

3. The combination with an air pump for tires having a discharge passage, a check valve in said discharge passage and a pipe communicating therewith having a coupling on its end for engaging the tire nipple, said coupling having means for holding the nipple valve open, of a valve casing having a relief port communicating with the discharge passage from said pump intermediate said check valve and coupling and provided with a valve seat, a valve thereon, a stem for said valve, a cushion spring about said stem for yieldingly holding the valve to its seat, a sleeve through which said stem extends adjustably threaded on said valve casing and engaging the outer end of said spring, and a cap threaded on said sleeve for engaging said stem and positively holding said valve to its seat, substantially as described.

4. A pressure regulating valve for tire pumps, comprising a valve casing having a relief port provided with a contracted inlet and a valve seat, a valve on said seat, a stem for said valve, a cushion spring surrounding said stem for yieldingly holding the same to its seat, a regulating sleeve loosely fitting about said stem engaging the outer end of said spring and fitting over and adjustably threaded on said valve casing to regulate the pressure of said spring, substantially as described.

5. A pressure regulating valve for tire pumps, comprising a valve casing having a relief port provided with a valve seat, a valve on said seat, a stem for said valve, a cushion spring surrounding said stem for yieldingly holding the same to its seat, an adjustable part engaging the outer end of said spring to regulate the pressure exerted thereby and an adjustable part for engaging the outer end of said stem to hold said valve positively on its seat, substantially as described.

6. A pressure regulating valve for tire pumps, comprising a valve casing having a relief port provided with a valve seat, a valve on said seat, a stem for said valve, a cushion spring surrounding said stem for yieldingly holding the same to its seat, a sleeve setting over and adjustably threaded on said valve casing and engaging the outer end of said spring, and a cap adjustably threaded on said sleeve for engaging the outer end of said stem to hold said valve positively to its seat, substantially as described.

7. A pressure regulating valve for tire pumps, comprising a cylindrical valve casing having a relief port extending through its lower portion, said casing having a conical valve seat at the upper end of said relief port and an enlarged recess in the body of the valve casing above and about said seat, a conical valve on said seat having a flange or shoulder arranged within said recess, an upwardly extending stem for said valve, a sleeve setting over and adjustably threaded upon said valve casing and having an opening in its end through which said valve stem extends, and a spring, for holding said valve to its seat, coiled about said stem, the end of said sleeve engaging the end of said spring to regulate the pressure thereof, as said sleeve is adjusted upon said valve casing.

8. A pressure regulating valve for tire pumps, comprising a cylindrical valve casing formed of upper and lower sections screw-threaded together, said lower casing section having a relief port with a conical valve seat at its upper end and an enlarged recess about and above the valve seat, a conical valve on said seat having an enlarged annular shoulder or flange arranged within said recess, a spring coiled about said stem for holding said valve to its seat and a part adjustably threaded to said upper casing section arranged to engage the upper end of said spring to regulate the pressure thereof, said part having an opening through which said stem extends, substantially as described.

9. A pressure regulating valve for tire pumps comprising a valve casing having a relief port provided with a valve seat, a valve on said seat, a stem for said valve, a cushion spring surrounding said stem for yieldingly holding the valve to its seat, a sleeve through which said stem loosely extends fitting over and adjustably threaded on said valve casing and engaging the end of said spring to regulate the pressure exerted thereby and means for locking said sleeve in adjusted position, substantially as described.

10. A pressure regulating valve for tire pumps comprising a valve casing having a relief port provided with a valve seat, a valve on said seat, a stem for said valve, a cushion spring surrounding said stem for yieldingly holding the valve to its seat, a sleeve through which said stem loosely extends fitting over and adjustably threaded on said valve casing and engaging the end of said spring to regulate the pressure exerted thereby and a combined scale and lock for said regulating sleeve comprising a spring catch fixed to the valve casing and having a pointed offset arranged to engage with any one of a series of holes arranged in the spiral in the lower portion of said sleeve, substantially as described.

11. A pressure regulating valve for tire pumps comprising a valve casing having a relief port provided with a valve seat, a valve on said seat, a stem for said valve, a cushion spring surrounding said stem for yieldingly holding said valve to its seat, a sleeve fitting over and adjustably threaded on said valve casing and engaging the outer end of said spring, said sleeve having a guide on its end through which said stem loosely extends and a cap adjustably threaded upon the enlarged outer end of said guide for engaging the outer end of said stem to hold the valve against movement on its seat, said cap having an inturned lip on its lower end below the enlarged portion of said guide for preventing the displacement thereof, substantially as described.

12. A pressure regulating valve for tire pumps comprising a lower casing section having a relief port provided with a conical valve seat adjacent its upper end, a conical valve engaging said seat having a depending guide fitting in said relief port, said valve having a central bore or socket, a valve stem the lower end of which loosely fits in the bore or socket of said valve, a cushion spring surrounding said stem and engaging a flange or shoulder thereon, an upper casing section threaded on said lower section and a sleeve through which said valve stem extends adjustably threaded on said upper casing section and engaging the upper end of said spring, substantially as described.

13. A pressure regulating valve for tire pumps comprising a lower casing section having a relief port provided with a conical valve seat adjacent its upper end, a conical valve engaging said seat and having a depending guide fitting in said relief port, said valve having a central bore or socket, a valve stem the lower end of which loosely fits in the bore or socket of said valve, a cushion spring surrounding said stem and engaging a flange or shoulder thereon, an upper casing section threaded on said lower section, a sleeve through which said valve stem extends adjustably threaded on the upper casing section and a spring catch on the valve casing arranged to engage one of a spiral series of holes in the lower end of said sleeve for locking the latter in adjusted position, substantially as described.

14. The combination with a hand operated air pump for tires, having a discharge passage, a check valve in said discharge passage and a pipe communicating with said discharge passage and having a coupling in its end for engaging the tire nipple, of a valve casing opening to the air and having a relief port communicating with the discharge passage of said pump intermediate said check valve and said coupling, said valve casing being provided with a valve seat, a valve thereon, a spring for yieldingly holding said valve on its seat and means for regulating the pressure exerted by said spring, substantially as described.

15. The combination with a hand operated air pump for tires, having a discharge passage provided with a check valve and a nipple and a pipe having a coupling on one end for engaging the tire nipple and connected at its other end to the nipple of said discharge passage, of a valve casing opening to the air and having a relief port communicating with the discharge passage of said pump intermediate said check valve and the nipple thereof, said valve casing having a valve seat about said relief port, a valve thereon, a stem for said valve, a cushion spring surrounding said stem for yieldingly holding said valve to its seat, and a sleeve adjustably threaded upon said valve casing and arranged to engage said spring to regulate the pressure thereof, said sleeve having an opening through which said valve stem extends, substantially as described.

16. The combination with a hand operated air pump for tires, having a discharge passage, a check valve in said discharge passage and a pipe communicating with said discharge passage and having a coupling on its end for engaging the tire nipple, of a relief valve casing mounted on the pump, said valve casing having a relief port communicating with the discharge passage of said pump intermediate said check valve and said pipe and said casing having a valve seat about said port, a valve on said seat, a stem for said valve, a sleeve surrounding and adjustably threaded upon said valve casing and having an end portion adapted to engage said spring to regulate the pressure thereof, said sleeve having a guide opening to receive the end of said valve stem and a scale coöperating with said sleeve to indicate the point of relief of said valve, substantially as described.

17. A pressure regulating valve for tire pumps, comprising a lower casing section and an upper, cylindrical casing section threaded to said lower casing section, said lower casing section having a relief port extending therethrough and a conical valve seat at its lower end, a conical valve on said seat having a depending guide, a valve stem extending through said upper casing section, the lower end of which engages a central socket in said valve, a cushion spring surrounding said stem and engaging a flange or shoulder thereon, a cylindrical sleeve extending about and adjustably threaded upon said upper casing section and having an end portion engaging the upper end of said spring to regulate the pressure thereof, said sleeve having an opening to receive and guide the upper end of said valve stem and a scale coöperating with said sleeve to indicate the point of relief of said valve, substantially as described.

18. A pressure relief valve for tire pumps, comprising a valve casing formed of a lower section and an upper, cylindrical section screw-threaded to said lower casing section, said lower casing section having a relief port extending therethrough and a conical valve seat at its upper end, a conical valve on said seat having a depending guide, a valve stem extending through said upper casing section, the lower end of which stem engages a central socket in said valve, a spring coiled about said stem and engaging a flange or shoulder thereon, said upper casing section having a reduced exteriorly threaded upper end, a sleeve fitting over and having internal threads to engage the exteriorly threaded portion of said upper casing section, the lower portion of said sleeve having an enlarged, unthreaded bore to fit over the main body of said upper casing section and said sleeve having an end portion for engaging the upper end of said spring to adjust the pressure thereof, and an opening to receive and guide the upper end of said stem, and a scale coöperating with said sleeve to indicate the point of relief of said valve, substantially as described.

JOHN DESMOND.

Witnesses:
LILLIAN PRENTICE,
KATHERINE GERLACH.